(12) United States Patent
Zheng et al.

(10) Patent No.: US 12,250,938 B2
(45) Date of Patent: *Mar. 18, 2025

(54) OUTDOOR MOSQUITO KILLING LAMP

(71) Applicant: NINGBO DAYANG TECHNOLOGY CO., LTD., Zhejiang (CN)

(72) Inventors: Jun Zheng, Zhejiang (CN); Yuanai Ning, Zhejiang (CN)

(73) Assignee: NINGBO DAYANG TECHNOLOGY CO., LTD., Ningbo (CN)

( * ) Notice: Subject to any disclaimer, the term of this patent is extended or adjusted under 35 U.S.C. 154(b) by 11 days.

This patent is subject to a terminal disclaimer.

(21) Appl. No.: 18/119,807

(22) Filed: Mar. 9, 2023

(65) Prior Publication Data

US 2023/0292728 A1   Sep. 21, 2023

(30) Foreign Application Priority Data

Mar. 21, 2022 (CN) .......................... 202220625277.3

(51) Int. Cl.
*A01M 1/04* (2006.01)
*A01M 1/22* (2006.01)

(52) U.S. Cl.
CPC .............. *A01M 1/04* (2013.01); *A01M 1/223* (2013.01); *A01M 2200/012* (2013.01)

(58) Field of Classification Search
CPC ... A01M 1/04; A01M 1/223; A01M 2200/012
See application file for complete search history.

(56) References Cited

U.S. PATENT DOCUMENTS

| 4,785,573 A | * | 11/1988 | Millard | ................... | A01M 1/04 |
| | | | | | 362/179 |
| 2023/0292731 A1 | * | 9/2023 | Zheng | .................... | F21V 3/049 |
| | | | | | 43/112 |

FOREIGN PATENT DOCUMENTS

| CN | 109169569 A | * | 1/2019 | ............. A01M 1/04 |

* cited by examiner

*Primary Examiner* — Richard G Davis (57) ABSTRACT

The disclosure discloses an outdoor mosquito killing lamp including a housing and a lamp cover connected to the housing; a mosquito killing assembly and a light emitting assembly are provided on the housing; the light emitting assembly includes an illuminant and a dazzling cover, the illuminant is connected to the housing and disposed between the housing and the lamp cover; the dazzling cover covers the illuminant and is disposed inside the lamp cover, and the lamp cover or the housing is provided with a connecting member. The outdoor mosquito killing lamp has not only the functions of lighting and mosquito killing, but also has the function of entertainment, which can meet the needs of modern people.

17 Claims, 6 Drawing Sheets

OUTDOOR MOSQUITO KILLING LAMP

CROSS-REFERENCE TO RELATED APPLICATIONS

The present disclosure claims priority of Chinese Utility Model Application No. 202220625277.3, filed on Mar. 21, 2022, the entire contents of which are hereby incorporated by reference.

TECHNICAL FIELD

The disclosure relates to the technical field of lamps, and more particularly to an outdoor mosquito killing lamp.

DESCRIPTION OF THE PRIOR ART

Due to insects, mosquitoes and other flying insects' phototaxis, the flying insects tend to congregate the place where there is light. To avoid mosquito bites and clumping of flying insects, various mosquito killing fixtures have been developed. For example, mosquito killing bulbs, outdoor mosquito killing lamps, and the like. The outdoor mosquito killing light is installed outdoors, can kill mosquitoes surrounding the mosquito killing lamp, and the number of mosquitoes in this area can be effectively reduced. However, the outdoor mosquito killing lamps in the prior art are simple in construction and have a single function, which cannot meet the needs of modern people.

SUMMARY OF THE DISCLOSURE

The technical problem to be solved by the present disclosure is to provide an outdoor mosquito killing lamp having a recreational function in addition to functions of lighting and mosquito killing, which meets the needs of modern people.

A technical solution of the present disclosure is to provide an outdoor mosquito killing lamp having a following structure. The outdoor mosquito killing lamp includes a housing and a lamp cover connected to the housing; wherein a mosquito killing assembly and a light emitting assembly are provided on the housing, the light emitting assembly includes an illuminant and a dazzling cover, the illuminant is connected to the housing and disposed between the housing and the lamp cover, the dazzling cover covers the illuminant and is disposed inside the lamp cover, and the lamp cover or the housing is provided with a connecting member.

Compared to the prior art, the outdoor mosquito killing lamp having the above structure of the preset disclosure, has the following advantages that:

The inside of the lamp cover of the outdoor mosquito killing lamp of the preset disclosure is provided with the dazzling cover, and the light emitted by the illuminant is refracted by the dazzling cover to produce a dazzling effect, such that the outdoor mosquito killing lamp has not only the functions of lighting and mosquito killing, but also the function of recreation, which meets the needs of modern people.

As a development, the dazzling cover is provided with a pattern producing a dazzling effect. With such a configuration, the dazzling cover has simple structure and results in a better dazzling effect.

As a development, the pattern is formed by a plurality of polygonal patterns connected one another. With such a configuration, the dazzling cover has simple structure and results in a more uniform dazzling effect.

As a development, the pattern is disposed on an inner surface of the dazzling cover and an outer surface of the dazzling cover is smooth. With such a configuration, the light emitted from the dazzling cover is more uniform.

As a development, the light emitting assembly further comprises an actuator connected to the housing, and the dazzling cover is connected to a torque output shaft of the actuator. With such a configuration, the actuator may drive the dazzling cover to rotate, which makes a dazzling light have a better flexibility and a better dazzling effect.

As a development, a connecting base is arranged on the housing, the illuminant and the actuator are mounted on the connecting base, and the illuminant and the actuator are accommodated within a receiving space formed between the connecting base and the lamp cover. Such a configuration is easy to be installed.

As a development, the connecting base is provided with a mounting groove, the actuator is mounted in the mounting groove, the illuminant is positioned outside of the mounting groove, and the torque output shaft passes through the illuminant and is exposed out of the illuminant; a central portion of the dazzling cover is fixedly connected to an end portion of the torque output shaft. Such a configuration results in an installation structure which is simple, compact and easy to be assembled.

As a development, a cover plate is disposed on the housing, the cover plate covers an opening of the mounting groove, a mounting hole is defined on the cover plate, and an end portion of the actuator is embedded in the mounting hole. With such a configuration, the cover plate covers the opening of the mounting groove, which results in a better overall effect.

As a development, a bottom of the mounting groove is provided with at least two connecting columns, the actuator is provided with fitting holes a number of which is the same as a number of the connecting columns, the cover plate is provided with first connecting holes, and each connecting column passes through one corresponding first connecting hole and one corresponding fitting hole and is fixedly connected to the illuminant. With such a configuration, the actuator has a simple assembly structure and is convenient to be assembled.

As a development, the mounting hole is eccentrically disposed on the cover plate, the torque output shaft is eccentrically disposed on the actuator, and the torque output shaft is mounted coaxially with the cover plate. With such a configuration, the installation of the actuator is allowed to make a reasonable space utilization, resulting in a more compact finishing structure.

As a development, the actuator is provided with a sleeve, the torque output shaft passes through the shaft sleeve and is exposed out of the actuator; a central part of a substrate of the illuminant is provided with a central hole, and the substrate surrounds the sleeve. With such a configuration, the substrate and the actuator have a simpler mating structure and a more reliable connection.

As a development, the illuminant further includes a plurality of light emitting members, the substrate is provided with a lighting control circuit, the plurality of light emitting members are annularly arranged at a periphery of the substrate, the light emitting members are electrically connected to the lighting control circuit. With such a configuration, the light emitting members can emit more uniform light, have a greater range of illumination, and can produce a better dazzling effect.

As a development, the mosquito killing assembly is accommodated within a receiving space formed between the connecting base and the housing; a plurality of through holes are disposed on a sidewall of the housing, the through holes communicate with an internal cavity of the housing, a supporting column and a control board are disposed in the housing, the mosquito killing assembly comprises a electrical mesh wrapped around the supporting column, and the electrical mesh is electrically connected to the control board. With such a configuration, the mosquito killing assembly is mounted within the housing, such structure is more properly designed and the grid has better mosquito killing effect.

As a development, the supporting column is fixedly connected to the housing, the connecting base is fixedly connected to an end portion of the supporting column; and the control board is mounted between the connecting base and an end portion of the supporting column distant from the connecting base. Such a configuration is designed more rationally and is helpful for circuit connection.

As a development, the mosquito killing assembly includes a mosquito attracting lamp, an end portion the supporting column adjacent to the control board is provided with an opening, the mosquito attracting lamp is disposed within the supporting column, the mosquito attracting lamp is electrically connected to the control board; and the supporting columns is made of a transparent material. Such a configuration further has a mosquito attracting effect from the mosquito attracting lamp, such that the mosquito killing assembly is more effective in mosquito eradicating.

As a development, the supporting column is integrally formed with the connecting base; a bottom of the mounting groove of the connecting base is provided with a mounting through hole, and a partition plate is disposed between the supporting column and the connecting base, the partition plate is provided with a routing hole, an internal cavity of the mounting groove communicates with an internal cavity of the supporting column through the mouting through hole and the routing hole. Such a configuration is simple, convenient for routing, convenient to be assembled.

As a development, the connecting member is a stud with one end connected to a central part of an outer sidewall of the lamp cover. With such a configuration, the outdoor mosquito killing lamp can be easily inserted into the grass through the stud, which is more convenient.

The reference numbers shown in the figures are: 1 housing, 101 upper housing, 102 lower housing, 103 through hole, 104 cover plate, 105 second connecting hole, 12 electrical mesh, 2 lamp cover, 3 dazzling cover, 301 polygonal patterns, 4 actuator, 401 motor, 402 gearbox, 403 sleeve, 404 step, 405 lug, 406 fitting hole, 407 torque output shaft, 5 substrate, 501 central hole, 502 first connecting hole, 503 light emitting member, 504 lighting control circuit, 6 connecting base, 601 mounting groove, 602 mounting through hole, 603 connecting column, 7 mosquito attracting lamp, 8 supporting column, 801 rib, 802 groove, 803 opening, 9 control board, 10 partition plate, 1001 routing hole, 11 connecting member.

DESCRIPTION OF EMBODIMENTS

For a better understanding of the present disclosure, various aspects of the present disclosure will be explained in more detail with reference to the accompanying drawings. It is to be understood that these detailed descriptions are only illustrative of exemplary embodiments of the present disclosure and are not intended to limit the scope of the present disclosure in any way. The reference numerals refer to the same elements throughout the description.

In the drawings, the thickness, size, and shape of objects have been slightly enlarged for ease of illustration. The drawings are merely examples and are not drawn strictly to scale.

It will be further understood that the terms "includes," "including," "having," "comprises," and/or "comprising," when used in this specification, specify the presence of stated features, integers, steps, operations, elements, and/or components, but do not exclude the presence or addition of one or more other features, integers, steps, operations, elements, components, and/or combination thereof.

Figure 1:
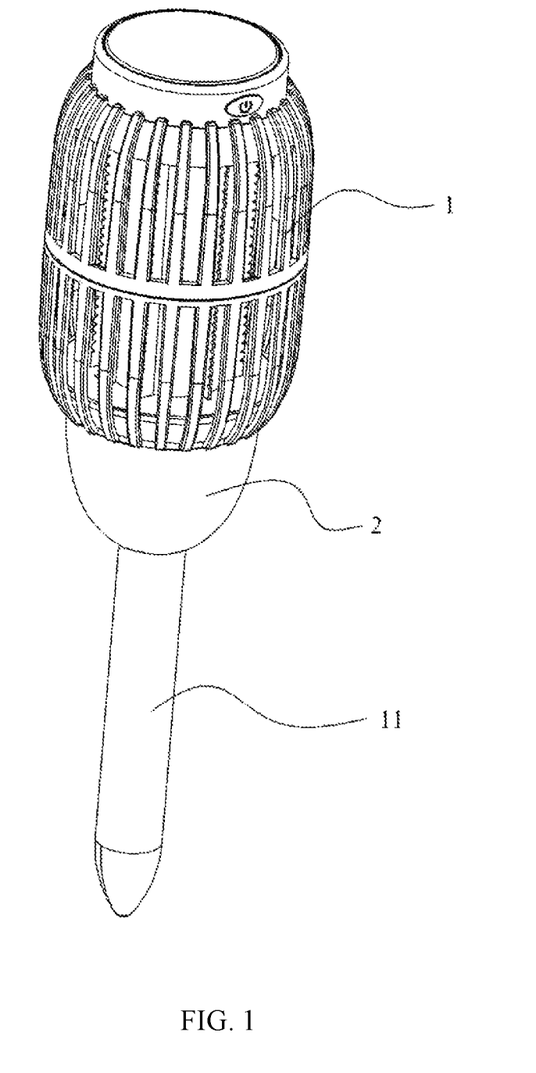
FIG. 1 is a schematic perspective view of an outdoor mosquito killing lamp of the present disclosure.
Figure 2:
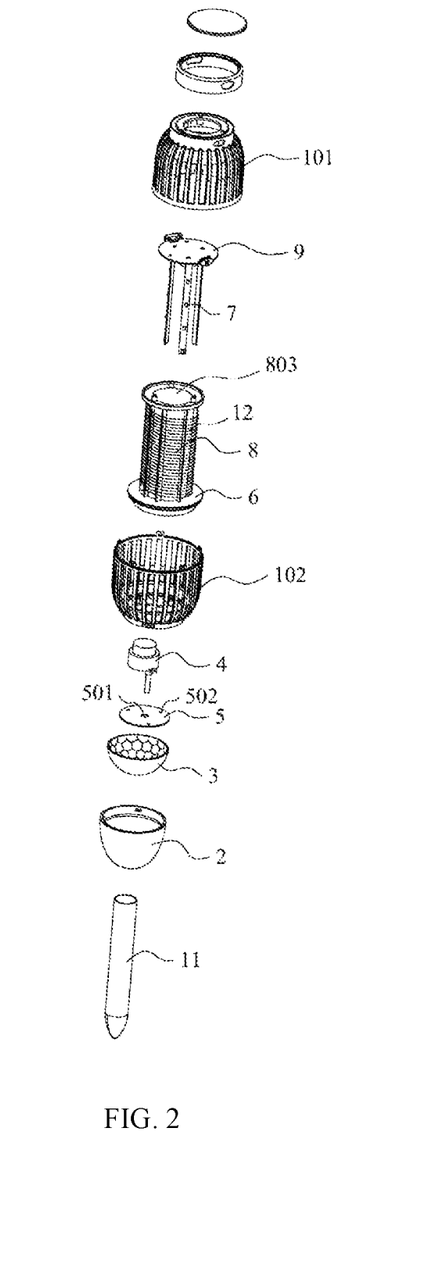
FIG. 2 is a schematic exploded view of the outdoor mosquito killing lamp of the present disclosure.
Figure 3:
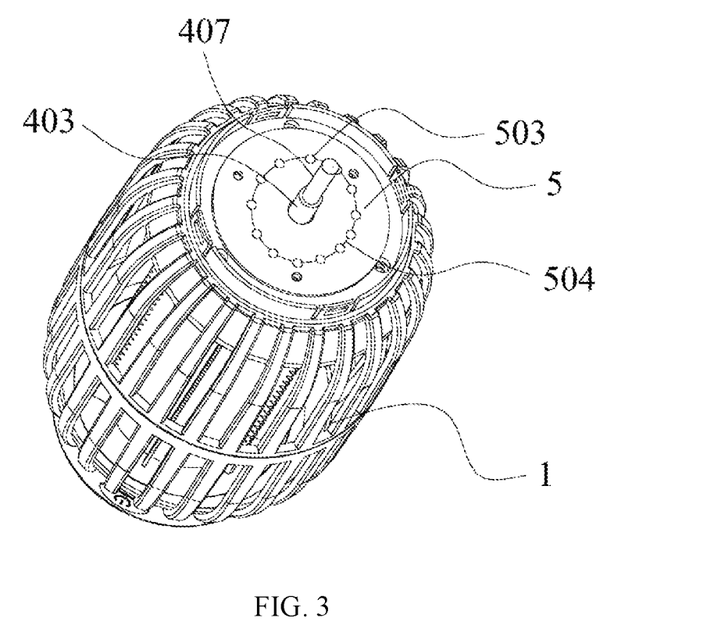
FIG. 3 is a schematic partial perspective view A of the outdoor mosquito killing lamp of the present disclosure.
Figure 4:
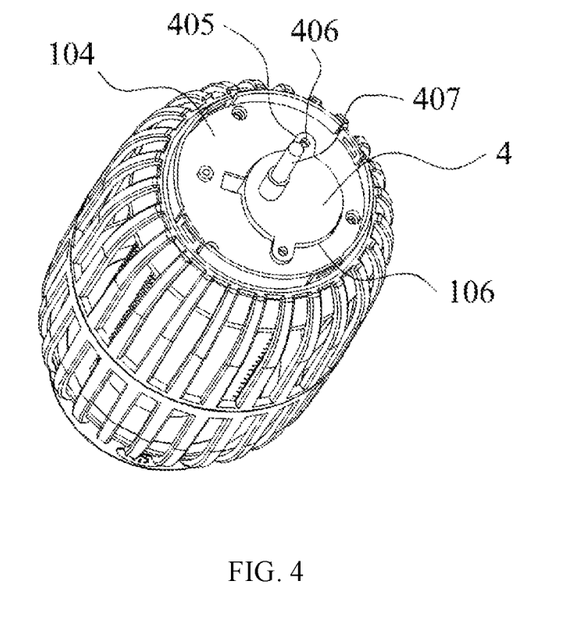
FIG. 4 is a schematic partially exploded view B of the outdoor mosquito killing lamp of the present disclosure.
Figure 5:
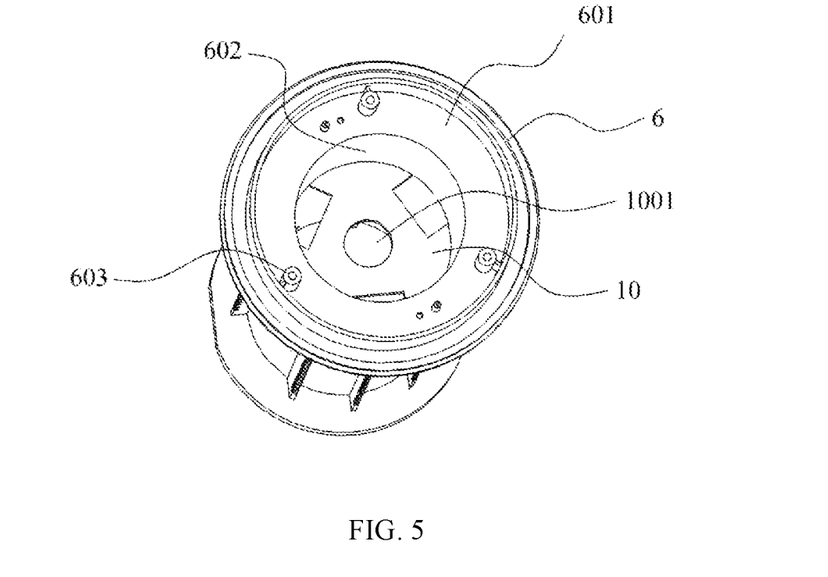
FIG. 5 is a schematic perspective view A of the connecting base and the supporting column of the outdoor mosquito killing lamp of the present disclosure.
Figure 6:
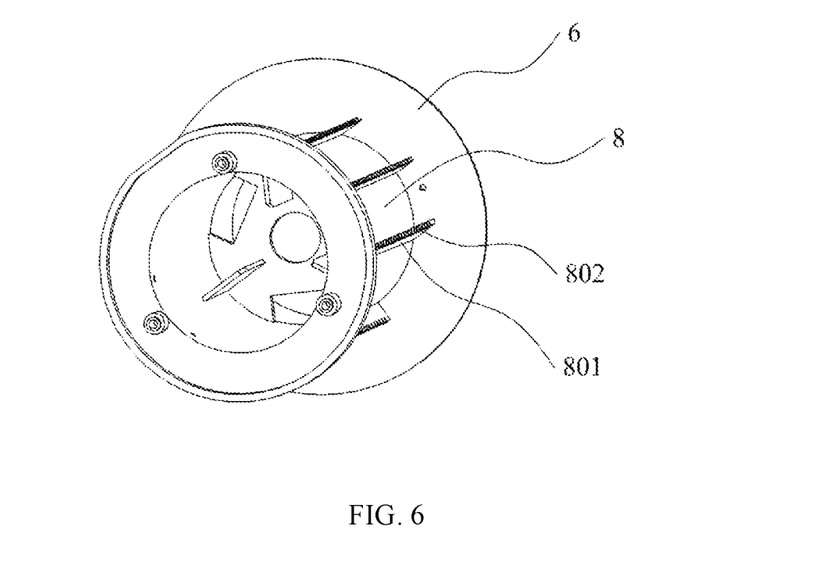
FIG. 6 is a schematic perspective view B of the connecting base and the supporting column of the outdoor mosquito killing lamp of the present disclosure.
Figure 7:
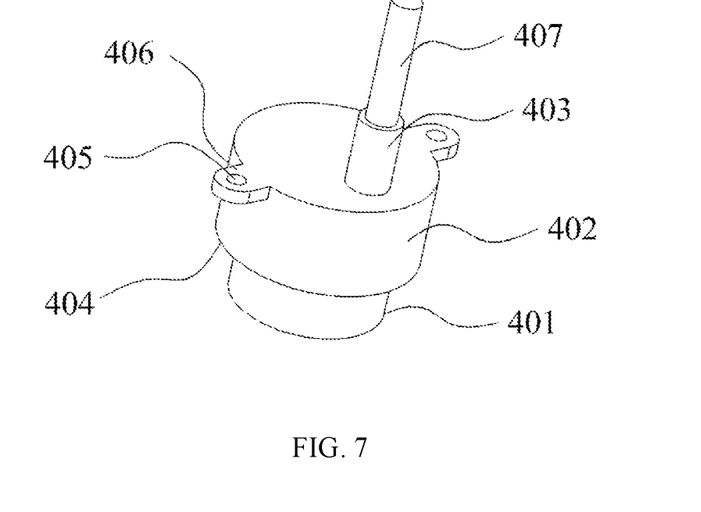
FIG. 7 is a schematic perspective view of the actuator of the outdoor mosquito killing lamp of the present disclosure.
Figure 8:
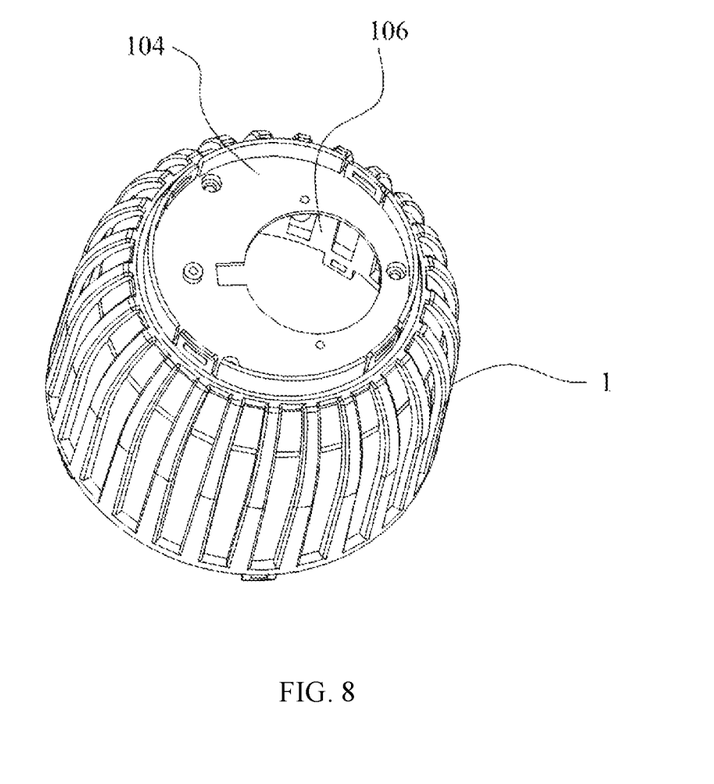
FIG. 8 is a schematic perspective view of a lower housing of the outdoor mosquito killing lamp of the present disclosure.

As shown in FIGS. 1-2, the present application discloses an outdoor mosquito killing lamp including a housing 1, a mosquito killing assembly, a light emitting assembly, and a lamp cover 2.

The housing 1 includes an upper housing 101 and a lower housing 102, the upper housing 101 and the lower housing 102 are connected through snap-fitting. Each of the upper housing 101 and the lower housing 102 is provided with a plurality of through holes 103. The through holes 103 are arranged evenly along a circumferential direction of the upper housing 101 and a circumferential direction of the lower housing 102, the through holes 103 communicate with an internal cavity of the housing 1, mosquitoes can pass through the through holes 103.

As shown in FIGS. 3 to 8, the light emitting assembly includes an illuminant, a dazzling cover 3, and an actuator 4. The illuminant includes a substrate 5 and a plurality of light emitting members 503. A lighting control circuit 504 is disposed on the substrate 5, and the plurality of light emitting members 503 are annularly arranged at a periphery of the substrate 5, and the light emitting members 503 are electrically connected to the lighting control circuit. The light emitting members 503 are LEDs, and the LEDs are controlled by the circuit to emit light of different colors. The actuator 4 includes a motor 401 and a gearbox 402, the motor 401 and the gearbox 402 are integrated. An input end of the gearbox 402 is connected to an output shaft of the motor 407, and an output end of the gearbox 402 is connected to a torque output shaft 507. An output shaft of the gearbox 402 is provided with a sleeve 403, the torque output shaft 407 passes through the sleeve 403 and is exposed out of the sleeve 403. A step 404 is disposed on a side wall of the actuator 4 and is located on a connection position of the motor 401 to the gearbox 402.

The lower housing 102 is provided with a connecting base 6, one side of the connecting base 6 distant from the upper housing 101 is provided with a mounting groove 601, an end portion of the lower housing 102 distant from the upper housing 101 is provided with a cover plate 104, and the cover plate 104 covers an opening of the mounting groove 601. A mounting hole 106 is defined on the cover plate 104, and communicates with the mounting groove 601. The mounting hole 106 is eccentrically disposed on the cover plate 104. The actuator 4 is mounted in the mounting groove 601 and an end portion of the actuator 4 is embedded in the mounting hole. The torque output shaft 407 is eccentrically disposed on the actuator 4, and the torque output shaft 407 is mounted coaxially with the cover plate 104. At least two connecting columns 603 are provided at a bottom of the mounting groove 601, the actuator 4 is provided with lugs 405 a number of which is the same as that of the connecting columns 603, each lug 405 is provided with a fitting hole 406, and the cover plat 104 is provided with first connecting holes 502. A central part of a substrate 5 of the illuminant is provided with a central hole 501, and the substrate 5 surrounds the sleeve 403. The substrate 5 is disposed on the cover plate 104 and presses on an outside of the actuator 4, the cover plate 104 is provided with second connecting holes 105 which are positioned corresponding to the first connecting holes 502, each second connecting hole 105 and each first connecting hole 502 are passed through by one screw to connect to a thread of one connecting column 603, such that the substrate 5 is fixedly connected to the connecting columns 603.

Figure 9:
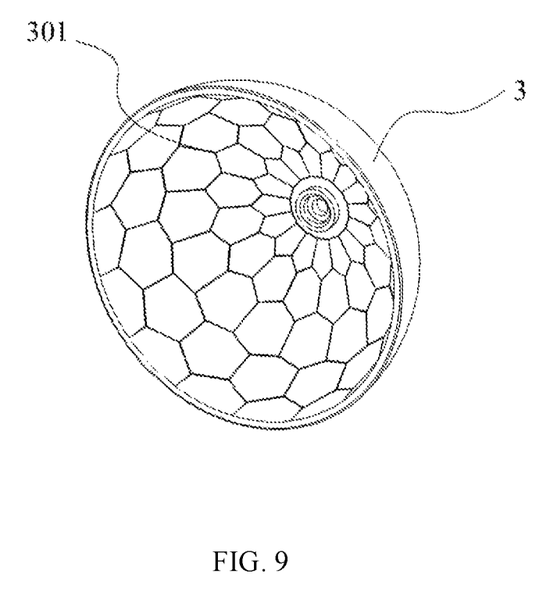
FIG. 9 is a schematic perspective view of the dazzling cover of the outdoor mosquito killing lamp of the present disclosure.

As shown in FIG. 9, the dazzling cover 3 is spherical shaped or partially spherical shaped, and an inner surface of the dazzling cover 3 is provided with a plurality of polygonal patterns 301, the polygonal patterns 301 are arranged in sequence from the central part to the periphery of the dazzling cover 3 and form loops, each loop is formed by a plurality of polygonal patterns 301 connected end to end along a circumferential direction. An outer surface of the dazzling cover 3 is smooth. The central part of the dazzling cover 3 is fixedly attached to an end portion of the torque output shaft 407, the dazzling cover 3 covers the illuminant. The light emitted by the light emitting members 503 is refracted by the dazzling cover 3 to produce a dazzling effect.

The mosquito killing assembly includes an electrical mesh, a mosquito attracting lamp 7 and a mosquito killing control circuit. A supporting column 8 is disposed within the housing 1, and the supporting column 8 is made of transparent material. One end of the supporting column 8 is fixedly connected to an end portion of the upper housing 102 distant from the lower housing 102, and the end of the supporting column 8 is provided with an opening 803. The other end of the supporting column 8 is fixedly connected to an end of the connecting base 6 distant from the illuminant, and the supporting column 8 is integrally formed with the connecting base 6. A plurality of ribs 801 are disposed on a sidewall of the supporting column 8 and are arranged circumferentially along the supporting column 8, each of the ribs 801 is provided with a plurality of grooves 802 along a length direction of the ribs 801, the electrical mesh 12 is wound around the ribs 801, and the electrical mesh 12 is electrically connected to the mosquito killing control circuit.

The mosquito attracting lamp 7 is mounted in the supporting column 8, the mosquito attracting lamp 7 is connected to the mosquito killing control circuit.

A control board 9 is disposed within the end portion of the upper housing 102 distant from the lower housing 102, the control board 9 is fixedly connected to the supporting column 8. The control board 9 is provided with a control circuit, and the mosquito killing control circuit is also integrated into the control board 9. A partition plate 10 is disposed on a connection position of the supporting column 8 and the connecting base 6, the partition plate 10 is provided with a routing hole 1001, the bottom of the mounting groove 601 is provided with a mounting through hole 602, and the mounting through hole 602 communicates with the routing hole 1001. The actuator 4 and the lighting control circuit 504 are electrically connected to the control circuit on the control board 9, that is, the wires of the actuator 4 and the lighting control circuit 504 are connected to the control board 9 after passing through the mounting through hole 602, the routing hole 1001 and the supporting column 8.

An open end of the lamp cover 2 is the end portion of the lower housing 102 such that the light emitting assembly is accommodated within the space formed between the lower housing 102 and the lamp cover 2, and the dazzling cover 3 is located inside the lamp cover 2. A central part of an outer sidewall of the lamp cover 2 is provided with a connecting member. In this embodiment the connecting member is a stud, an upper end of the stud is connected to the lamp cover 2 and a lower end of the stud is provided a tip for insertion into the ground.

When the outdoor mosquito killing lamp disclosed by the present application is in use, the control circuit may control a switch of the mosquito killing assembly as well as a switch of the light emitting assembly, and when the light emitting assembly is turned on, the light from the illuminant is refracted by the dazzling cover 3 and the lamp cover 2 to produce a dazzling effect, the actuator 4 can drives the dazzling cover 3 to rotate.

The invention claimed is:

1. An outdoor mosquito killing lamp, comprising a housing and a lamp cover connected to the housing; wherein a mosquito killing assembly and a light emitting assembly are provided on the housing, the light emitting assembly comprises an illuminant and a dazzling cover, the illuminant is connected to the housing and disposed between the housing and the lamp cover, the dazzling cover covers the illuminant and is disposed inside the lamp cover, and the lamp cover or the housing is provided with a connecting member.

2. The outdoor mosquito killing lamp according to claim 1, wherein the dazzling cover is provided with a pattern producing a dazzling effect.

3. The outdoor mosquito killing lamp according to claim 2, wherein the pattern is formed by a plurality of polygonal patterns connected one another.

4. The outdoor mosquito killing lamp according to claim 2, wherein the pattern is disposed on an inner surface of the dazzling cover and an outer surface of the dazzling cover is smooth.

5. The outdoor mosquito killing lamp according to claim 1, wherein the light emitting assembly further comprises an actuator connected to the housing, and the dazzling cover is connected to a torque output shaft of the actuator.

6. The outdoor mosquito killing lamp according to claim 5, a connecting base is arranged on the housing, the illuminant and the actuator are mounted on the connecting base, and the illuminant and the actuator are accommodated within a receiving space formed between the connecting base and the lamp cover.

7. The outdoor mosquito killing lamp according to claim 6, wherein the connecting base is provided with a mounting groove, the actuator is mounted in the mounting groove, the illuminant is positioned outside of the mounting groove, and the torque output shaft passes through the illuminant and is exposed out of the illuminant; a central portion of the dazzling cover is fixedly connected to an end portion of the torque output shaft.

8. The outdoor mosquito killing lamp according to claim 7, wherein a cover plate is disposed on the housing, the cover plate covers an opening of the mounting groove, a mounting hole is defined on the cover plate, and an end portion of the actuator is embedded in the mounting hole.

9. The outdoor mosquito killing lamp according to claim 8, wherein a bottom of the mounting groove is provided with at least two connecting columns, the actuator is provided with fitting holes a number of which is the same as a number of the connecting columns, the cover plate is provided with first connecting holes, and each connecting column passes through one corresponding first connecting hole and one corresponding fitting hole and is fixedly connected to the illuminant.

10. The outdoor mosquito killing lamp according to claim 8, wherein the mounting hole is eccentrically disposed on the cover plate, the torque output shaft is eccentrically disposed on the actuator, and the torque output shaft is mounted coaxially with the cover plate.

11. The outdoor mosquito killing lamp according to claim 7, wherein the actuator is provided with a sleeve, the torque output shaft passes through the sleeve and is exposed out of the actuator; a central part of a substrate of the illuminant is provided with a central hole, and the substrate surrounds the sleeve.

12. The outdoor mosquito killing lamp according to claim 11, wherein the illuminant further comprises a plurality of light emitting members, the substrate is provided with a lighting control circuit, the plurality of light emitting members are annularly arranged at a periphery of the substrate, the light emitting members are electrically connected to the lighting control circuit.

13. The outdoor mosquito killing lamp of claim 12, wherein the supporting column is integrally formed with the connecting base; a bottom of the mounting groove of the connecting base is provided with a mounting through hole, and a partition plate is disposed between the supporting column and the connecting base, the partition plate is provided with a routing hole, an internal cavity of the mounting groove communicates with an internal cavity of the supporting column through the mounting through hole and the routing hole.

14. The outdoor mosquito killing lamp according to claim 7, wherein the mosquito killing assembly is accommodated within a receiving space formed between the connecting base and the housing; a plurality of through holes are disposed on a sidewall of the housing, the through holes communicate with an internal cavity of the housing, a supporting column and a control board are disposed in the housing, the mosquito killing assembly comprises a electrical mesh wrapped around the supporting column, and the electrical mesh is electrically connected to the control board.

15. The outdoor mosquito killing lamp according to claim 14, wherein the supporting column is fixedly connected to the housing, the connecting base is fixedly connected to an end portion of the supporting column; and the control board is mounted between the connecting base and an end portion of the supporting column distant from the connecting base.

16. The outdoor mosquito killing lamp according to claim 15, wherein the mosquito killing assembly comprises a mosquito attracting lamp, an end portion the supporting column adjacent to the control board is provided with an opening, the mosquito attracting lamp is disposed within the supporting column, the mosquito attracting lamp is electrically connected to the control board; and the supporting columns is made of a transparent material.

17. The outdoor mosquito killing lamp according to claim 1, the connecting member is a stud with one end connected to a central part of an outer sidewall of the lamp cover.

* * * * *